United States Patent
Dong (10) Patent No.: US 7,774,362 B2
(45) Date of Patent: Aug. 10, 2010

(54) MULTIMEDIA CLIENT/SERVER SYSTEM WITH SECURE ACCESS DATA SHARING AND METHODS FOR USE THEREWITH

(75) Inventor: Sui Wu Dong, Markham (CA)

(73) Assignee: VIXS Systems, Inc., Toronto, Ontario (CA)

( * ) Notice: Subject to any disclaimer, the term of this patent is extended or adjusted under 35 U.S.C. 154(b) by 276 days.

(21) Appl. No.: 11/600,506

(22) Filed: Nov. 16, 2006

(65) Prior Publication Data

US 2008/0120657 A1    May 22, 2008

(51) Int. Cl.
*G06F 17/30*    (2006.01)

(52) U.S. Cl. .................... 707/781; 707/783; 707/782

(58) Field of Classification Search .................... None
See application file for complete search history.

(56) References Cited

U.S. PATENT DOCUMENTS

| | | | |
|---|---|---|---|
| 2004/0214551 A1* | 10/2004 | Kim | 455/412.1 |
| 2006/0222322 A1* | 10/2006 | Levitan | 386/68 |
| 2007/0027365 A1* | 2/2007 | Kosted | 600/300 |
| 2007/0097878 A1* | 5/2007 | Morioka et al. | 370/254 |
| 2008/0083035 A1* | 4/2008 | Dong et al. | 726/26 |

* cited by examiner

*Primary Examiner*—Baoquoc N To
(74) *Attorney, Agent, or Firm*—Garlick Harrison & Markison; Bruce E. Stuckman (57) ABSTRACT

A multimedia client/server system, prior to transmitting multimedia data over an RF communication link, shares secure access data between the client module. The secure access data is used to securing communication between the server transceiver module and the client transceiver module over the RF communication link.

6 Claims, 11 Drawing Sheets

MULTIMEDIA CLIENT/SERVER SYSTEM WITH SECURE ACCESS DATA SHARING AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network (LAN) may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

The wireless LAN can be secured via encryption methods that require an encryption key. When the wireless local area network is installed the encryption key must be chosen and manually entered by the user in each device. In addition, when a new client device is added to the network, the encryption key must be remembered so that it can be manually entered by the user. This process is time consuming and can lead to installation problems where the encryption key is lost.

DETAILED DISCUSSION OF A PREFERRED EMBODIMENT

Figure 1:
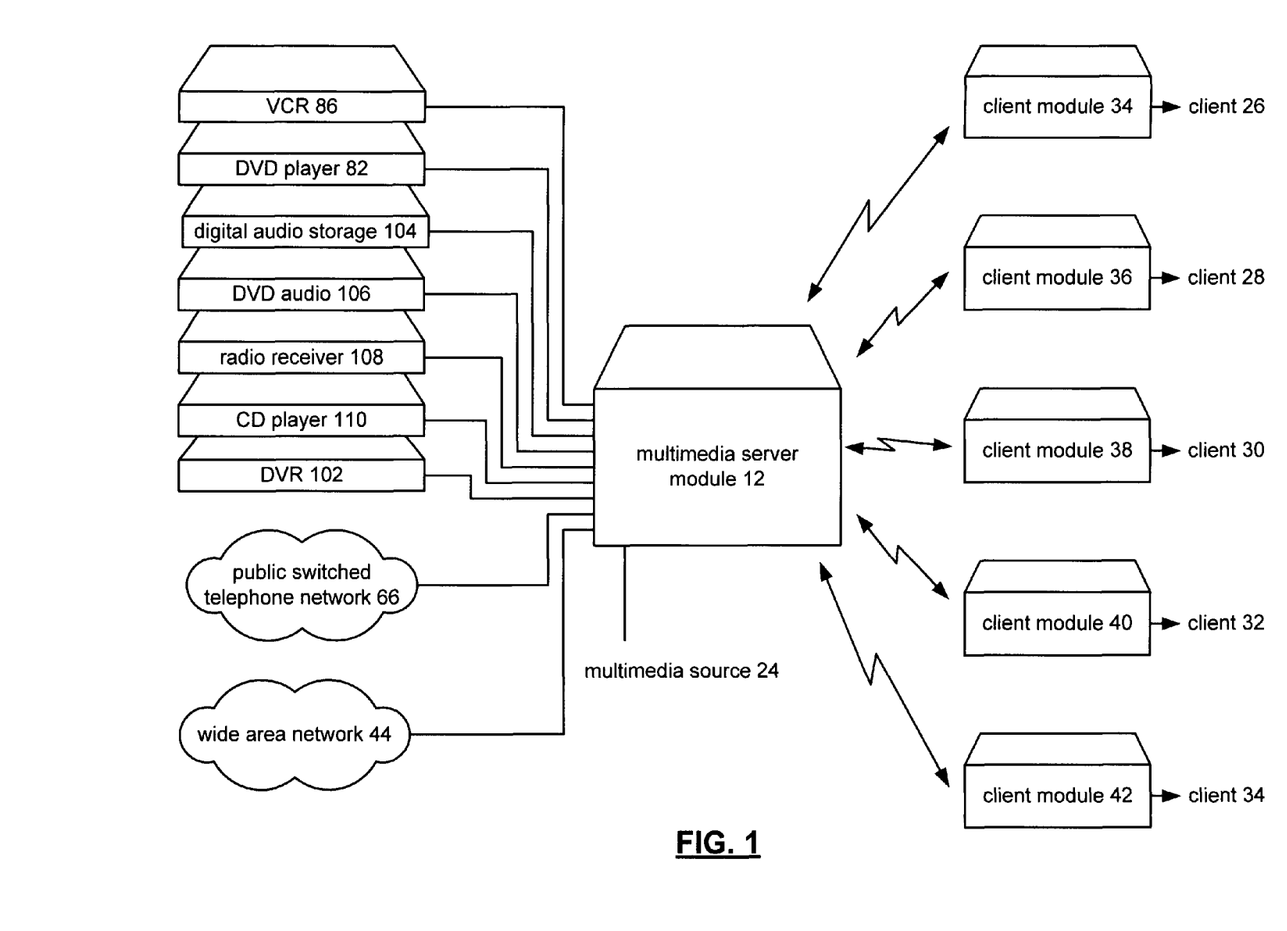
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server module 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server module 12 in processing the request. As such, one client may be accessing the Internet, while another client is watching a satellite broadcast channel, while another is listening to a CD playback, while another is talking on the telephone, and yet another is watching a DVD playback. This is all done via the multimedia server module 12 without requiring the clients to have direct access to the multimedia sources and without the requirement that each client have its own multimedia source and/or multimedia source connection.

The multimedia server module 12 and one or more of the client modules 34, 36, 38, 40 and 42 include one or more features for increasing the reliability and quality of wireless transmission in accordance with the present invention, as will be described in greater detail in the Figures that follow, and in particular, with reference to FIGS. 2-11.

Figure 2:
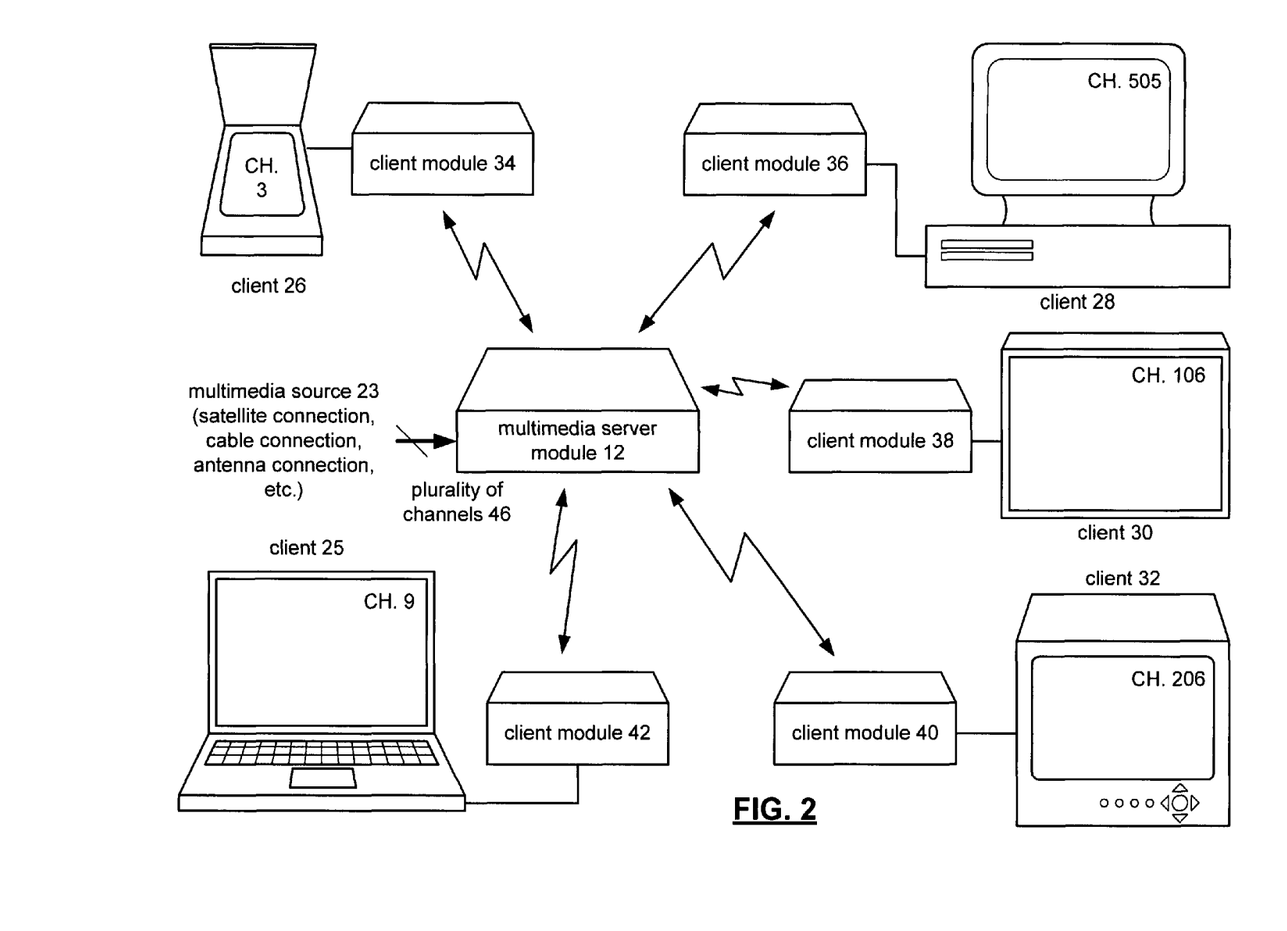
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server module 12, a plurality of client modules 34, 36, 38, 40 and 42 that are operably coupled to a plurality of clients 25, 26, 28, 30, and 32. The multimedia server module 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server module 12 may be a stand-alone device, may be incorporated in a satellite receiver, set-top box, cable box, HDTV tuner, home entertainment receiver, et cetera. In addition, the multimedia server module 12 may be implemented using discrete components, integrated circuits, and/or a combination thereof.

The multimedia server module 12 communicates with the plurality of client modules 34, 36, 38, 40, and 42 via a radio frequency communication path. As such, the multimedia server module 12 and each of the client modules 34, 36, 38, 40 and 42 each include a transceiver that operates to send and receive data via the communication path.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server module 12. The multimedia server module 12 selects channel 3 from the plurality of channels 46. The data corresponding to channel 3 is then time multiplexed with the data for the other channels and transmitted from the multimedia server module 12 to each of the client modules 34, 36, 38, 40 and 42. Client module 34 monitors the transmission from the multimedia server module 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server module 12. Multimedia server module 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server module 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

Figure 3:
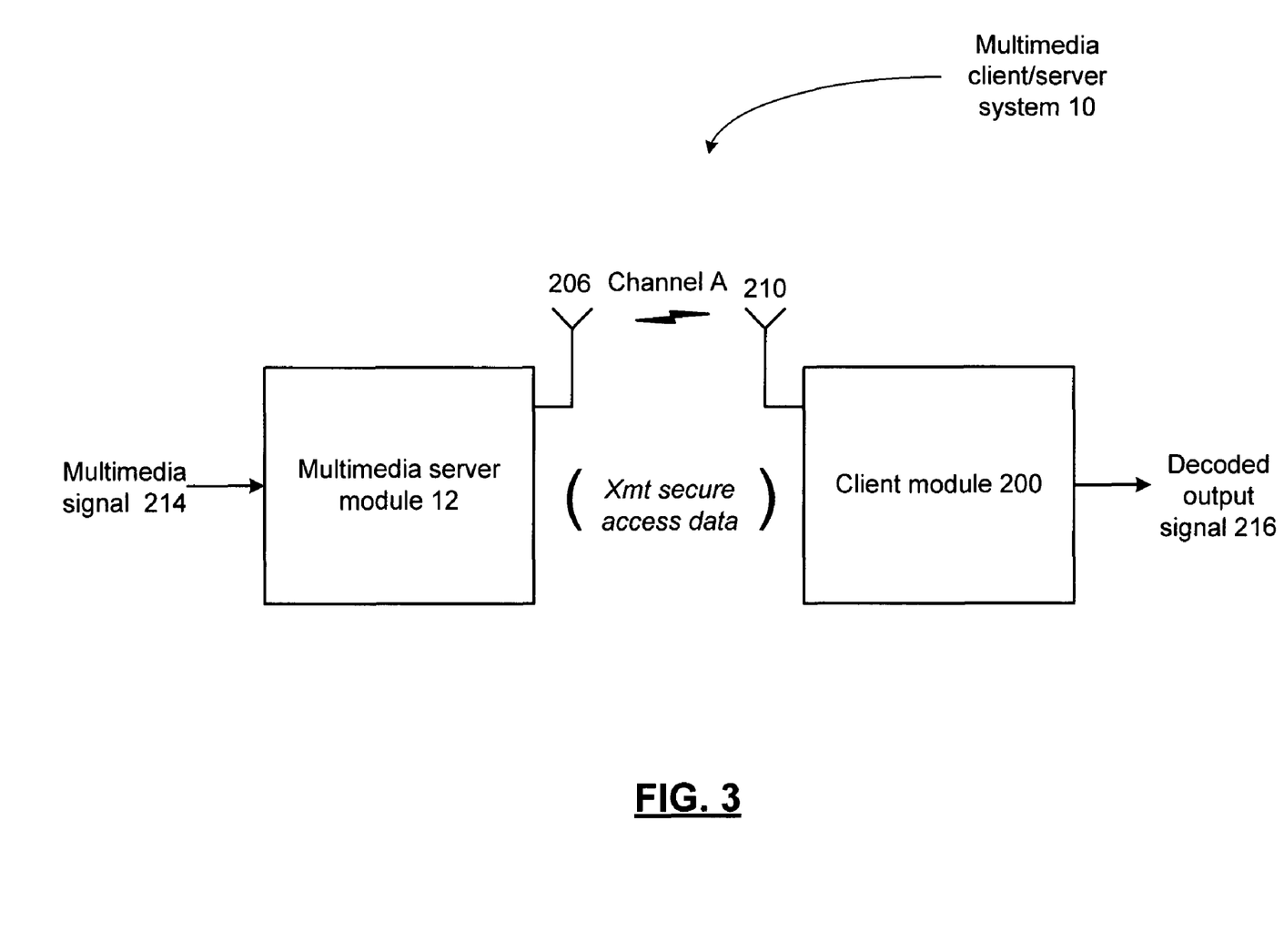
FIG. 3 presents a block diagram representation of a multimedia client/server system 10 in accordance with an embodiment of the present invention.

FIG. 3 presents a block diagram representation of a multimedia client/server system 10 in accordance with an embodiment of the present invention. In particular, the multimedia client/server system 10 includes multimedia server module 12 that transmits a multimedia signal 214, such as a broadcast, stored or streaming signal from multimedia source 23. Multimedia server module 12 transmits, via antenna 206, a radio frequency (RF) signal that contain the multimedia content from multimedia signal 214. This RF signal is transmitted at a carrier frequency corresponding to a channel such as channel A of an RF spectrum. Client module 200, (such as client modules 34, 36, 38, 40 and 42) receives the RF signal via antenna 210 and produces a decoded output signal 216.

It should be noted that channel A represents a channel of an RF spectrum corresponding to one or more carrier frequencies. This is as opposed to channels 3, 9, 106, 206 and 505 discussed in association with FIG. 2 where "channel", is this context, was used primarily to denote different streams of multimedia content such as "The Weather Channel", "The Discovery Channel" or "Gone with the Wind". In the event that noise, interference or fading hamper the performance of one of the channels, the multimedia server module 12 can switch to a different channel.

In an embodiment of the present invention, the transmitted multimedia content can further be encrypted in the encoding process and decrypted in the decoding process, such as by RSA encryption, WEP, or protected using other secure access protocols such as MAC address filtering, so that if the content is wirelessly received by an authorized client device, the multimedia content can be otherwise protected. Multimedia server module 12 and client module 200 share secure access data during an initialization procedure in order to secure the wireless communications between these two devices.

For example, multimedia server module 12 encrypts its transmissions using an encryption key that is either set by the factory during the manufacturing process or set by the user via a user interface of multimedia server module 12 or of a terminal, such as a separate computer that is coupled thereto. Secure access data, includes such information as the encryption key and/or password or other authentication or security data required to establish a secure connection and optionally other set-up data including an internet protocol address (IP address), media access control (MAC) address, service set identifier (SSID). This secure access data can be transmitted by the multimedia server module 12 to the client module (or vice versa) over channel A of the RF communication link in order to establish a secure communication.

In this initialization mode, the multimedia server module 12 can transmit a data packet in an unsecured fashion that contains the secure access data and other optional data, either as part of a special beacon or other transmission. In response, the client module 200 wishing to be paired with the multimedia server module server 12 can respond by acknowledging the receipt of the secure access data and provide any additional data such as an IP address, MAC address, an encryption key used by client module 200 for back channel communication or other data that may be required to finalize the establishment of the secure communication, as part of data packet in a request to associate message or other message.

Because the secure access data is sent prior to securing the link, other measures of security can be employed to prevent this data from being intercepted by unauthorized devices. In an embodiment of the present invention, the multimedia server module 12 and client module 200 are placed in close proximity to one another and potentially in an open line of sight (such as adjacent to one another or within a few feet or less) during this set-up process and transmit power is set at a low power level to avoid reliable reception outside this close proximity, or through walls or other potentially intervening obstructions. During this initialization procedure, the secure access data, including the encryption key or password, are transferred to the client module 200 and other security data is shared and stored in each device. When the multimedia server module 12 and client module 200 are placed in their intended locations, normal operation can commence with the devices operating at full power and with the RF communication link secured, via password protection, encryption, etc, based on the secure access data that is shared.

Further functions and features of the multimedia server module 12 and client module 200 including several alternative embodiments are presented in conjunction with FIGS. 4-11 that follow.

Figure 4:
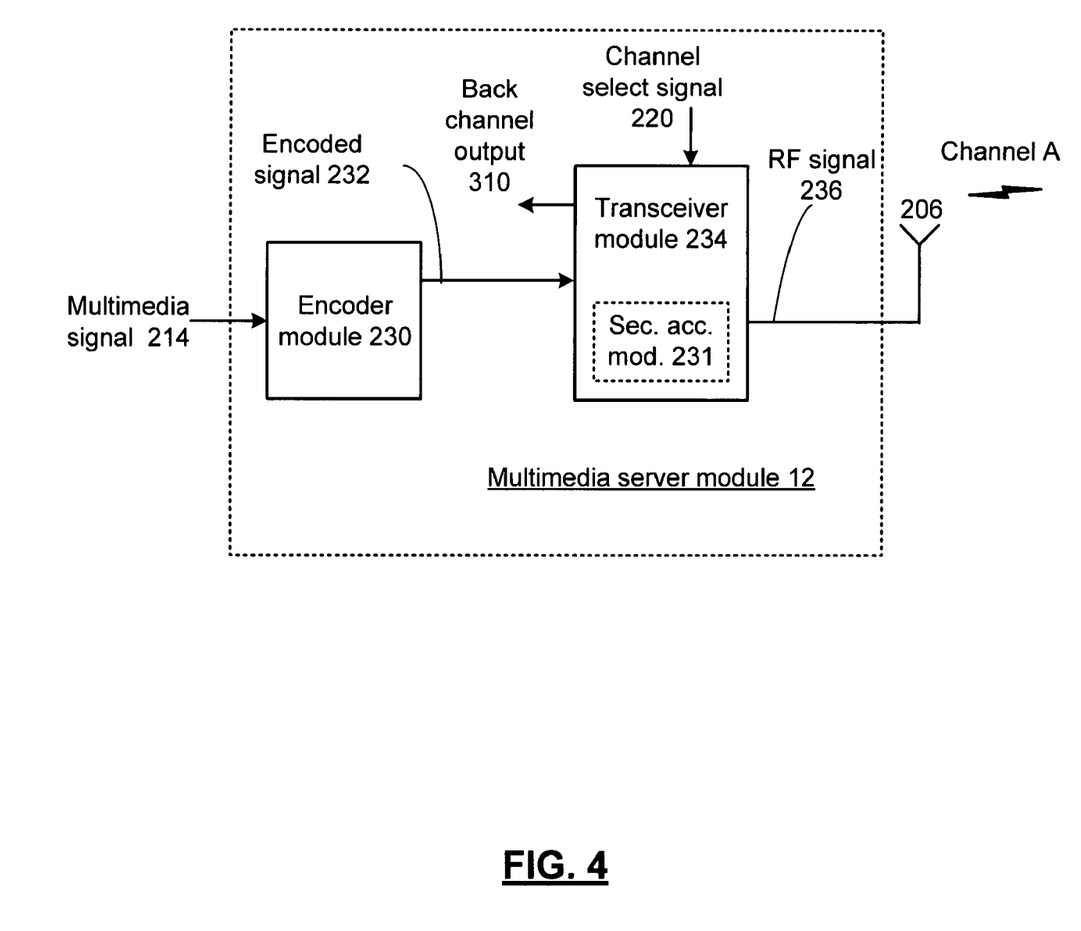
FIG. 4 presents a block diagram representation of a multimedia server module 12 in accordance with an embodiment of the present invention.

FIG. 4 presents a block diagram representation of a multimedia server module in accordance with an embodiment of the present invention. In particular, multimedia server module 12 includes an encoder module 230 for producing an encoded signal 232 from unencoded multimedia input signal 214. In an embodiment of the present invention, the encoding scheme may be one or more of multilevel, multiphase and multifrequency encoding, non-return to zero encoding, Manchester encoding, block encoding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channel A. In an embodiment, the multimedia signal 214 includes an analog composite video signal that is formatted in any of a number of video formats including National Television Systems Committee (NTSC), Phase Alternating Line (PAL) or Sequentiel Couleur Avec Memoire (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2, MPEG4), a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

In an embodiment of the present invention, encoder module 230 generates an encoded signal 232 from the multimedia signal 214 that is in a digital format such as an MPEG, a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. Transceiver module 234, in turn, produces RF signal 236 that includes the encoded signal 232, and wirelessly transmits the RF signal 236 to a client device, such as through client module 200. In an embodiment of the present invention, encoder module 230 can operate as a transcoder to receive a multimedia signal 214 in a first digital format, decode this signal and re-encode it into a second digital format for transmission. For example, multimedia input 214 can include a compressed MPEG2/4 input. The encoder module 230 operates to decompress the signal and re-encode it in another format, such as H.264. In addition, encoder module 230 can receive a multimedia input signal that is in a digital format such as High-Definition Multimedia Interface (HDMI). The encoder module 230 can compress and encode the digital signal into a compressed digital format.

In an embodiment of the present invention, the non-RF portions of the transceiver module 234 and the encoder module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the transceiver module 234 and/or encoder module 230 implement one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

Transceiver module 234 modulates the encoded signal 232 to produce a RF signal 236 that includes multimedia content such as a packetized video signal at a first carrier frequency and transmits the RF signal 236 over channel A using antenna 206. In addition, transceiver module 234 produces back channel output 310 based on an RF signal received from the client module 200 over channel A. While not expressly shown, multimedia server module 12 includes a decoder module, such as decoder module 254 that will be discussed in conjunction with FIG. 5, for operating the back channel in a reciprocal fashion.

In an embodiment of the present invention, transceiver module 234 is selectively tunable to a plurality of other carrier frequencies in response to channel selection signal 220. For instance, in an implementation of the multimedia server module 12 and client module 200 using wireless transmission link in the United States that conforms with the IEEE 802.11g standard, channel A can be selected as any of the 11 allocated channels. In an embodiment of the present invention, the channel selection signals can be preprogrammed into multimedia server module 12, dynamically chosen based on a site survey that scans the available channels to determine a suitable channel for use, received from the client module 200 or arbitrated between the client module 200 and multimedia server module 12, or selected under user control. Similarly, channel A can be implemented as a channel of a broadband wireless access network that conforms to at least one of the following standards: 802.11a, b, n or other 802.11 standard, Ultra Wideband (UWB), or Worldwide Interoperability for Microwave Access (WiMAX). Transceiver module 234 includes secure access module 231 for securing the RF communication link by optionally encrypting the encoded signal 232, password protecting the data or through other secure access protocol or methodology. While shown as part of transceiver module 234, secure access module 231 can optionally be implemented as a stand alone module.

In operation, during an initialization procedure performed prior to transmitting the channel signal, the multimedia server module 12 transmits secure access data to the client module, such as client module 200, in order to secure the wireless communication over the RF communication link. In particular, secure access module 231 generates secure access data that is transmitted to the client module, such as client module 200. When placed in normal operation, the client module 200 can use the encryption key or password included in the secure access data to decrypt the transmitted data, or to decode or unlock the multimedia data transmitted by multimedia server module 12.

In addition, secure access module 231 can operates in conjunction with the secure access module of the client device to share secure access data that may be needed to establish either unidirectional or bidirectional secure communications between the multimedia server module 12 and the client module, such as client module 200. In particular, the secure access module of client device 200 can generate secure access data that is transmitted to the multimedia server module 12, including an encryption key and/or password to secure the back channel transmissions from client device 200 to multimedia server module 12. In this fashion, secure access module 231 can include encryption and decryption or other secure access functionality to secure the RF communications link between multimedia server module 12 and one or more client modules and to access received secure transmissions, based on the secure access data.

As discussed in conjunction with FIG. 3, secure access module 231 is operative, in the initialization process, to automatically set the transceiver module 234 in a low power mode. For example, secure access module 231 can assert an initialization flag during the initialization process, and the transceiver module 234 can place the transmitter of transceiver module 234 in a low power mode when the initialization flag is asserted. In this fashion, unauthorized reception of the secure access data can be prevented.

Figure 5:
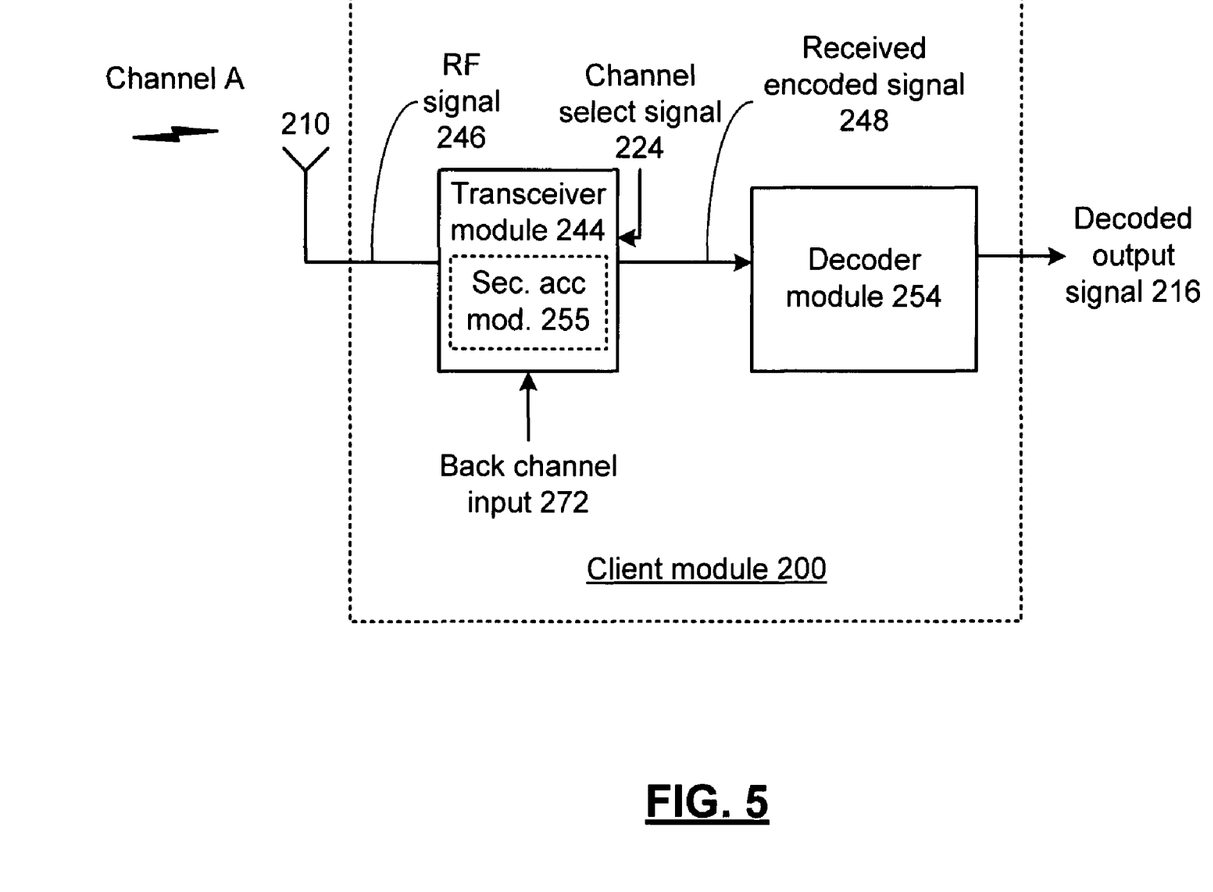
FIG. 5 presents a block diagram representation of a client module 200 in accordance with an embodiment of the present invention.

FIG. 5 presents a block diagram representation of a client module 200 in accordance with an embodiment of the present invention. In particular, client module 200 includes transceiver module 244 for receiving RF signal 246 over channel A or an alternate channel selected by multimedia server module 12 and for converting the RF signal 246 into a received encoded signal 248. In addition, transceiver module 244 is operable to modulate back channel input 272 to produce RF signals sent to multimedia server module 12 over channel A. While not expressly shown, client module 200 includes a encoder module, such as encoder module 230 for operating the back channel in a reciprocal fashion.

Transceiver module 244 includes secure access module 255 that handles the sharing of secure access data from (and potentially to) the multimedia server module 12, that decrypts the received encoded signal 246 or otherwise accesses the multimedia content of RF signal 246 using the encryption key, password or other secure access data received from multimedia server module 12, as discussed in conjunction with FIGS. 3 and 4. While shown as part of transceiver module 244, secure access module 255 can optionally be implemented as a stand alone module.

As discussed, secure access module 255 can operate in conjunction with secure access module 231 (and in a reciprocal fashion) to share secure access data as may be needed to establish either unidirectional or bidirectional secure communications between the multimedia server module 12 and client module 200. In particular, the secure access module of client device 200 can generate secure access data that is transmitted to the multimedia server module 12, including an encryption key and/or password to secure the back channel transmissions from client device 200 to multimedia server module 12. In addition, the secure access module of client device 200 can receive secure access data that is transmitted from the multimedia server module 12, including an encryption key and/or password to secure forward channel transmissions from client device 200 to multimedia server module 12. Secure access module 231 can include encryption and decryption or other secure access functionality to secure the RF communications link between client module 200 and the multimedia server module 12 and to access received secure transmissions, based on the secure access data.

In an embodiment of the present invention, multimedia server module 12 and client module 200 use a wireless transmission link that conforms with the IEEE 802.11g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. Received encoded signal 248 can be a baseband signal or a low intermediate frequency (IF) signal.

In an embodiment of the present invention, received encoded signal 248 can optionally be sent to decoder module 254 through a physical electronic connection such as Universal Serial Bus (USB), Personal Computer Interface (PCI), Firewire, or small computer service interface (SCSI), ASI (Asynchronous Serial Interface), or SPI (Serial Peripheral Interface). However, other physical electronic connections, either standard or proprietary may likewise be implemented or used within the broad scope of the present invention.

Client module 200 further includes decoder module 254 for decoding the received encoded signal 248 into a decoded output signal 216, such as in a format used by the attached client. In particular, further decoding of the data can include decompression of a compressed digital signal, formatting of a video signal as in NTSC, PAL, SECAM, etc., and other formatting to match the input format of the client device. As discussed above, transceiver module 244 receives and demodulates RF signal 246 to produce a received encoded signal 248.

In an embodiment of the present invention, the non-RF portions of transceiver module 244 and the decoder module 254 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the transceiver module 244 and or decoder module 254 implement one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

In an embodiment of the present invention, transceiver module 244 is selectively tunable to a plurality of other carrier frequencies in response to channel selection signals 224. For instance, in an implementation of the multimedia server module 12 and client module 200 using wireless transmission link in the United States that conforms with the IEEE 802.11g standard, channel A can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 6:
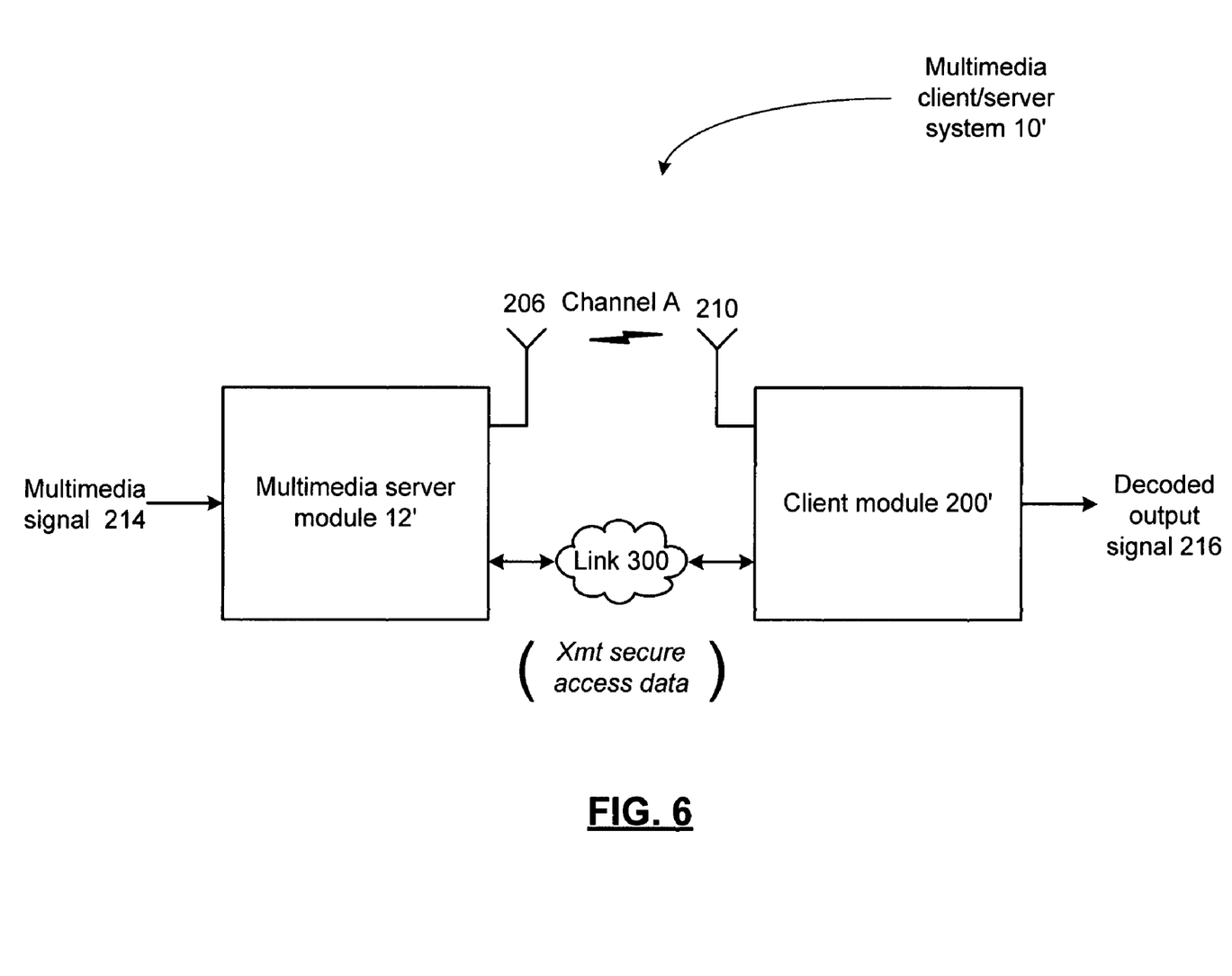
FIG. 6 presents a block diagram representation of a multimedia client/server system 10' in accordance with an embodiment of the present invention.

FIG. 6 presents a block diagram representation of a multimedia client/server system 10' in accordance with an embodiment of the present invention. In particular, multimedia server module 12' and client module 200' operate, respectively, with similar functions to multimedia server module 12 and client module 200, however, alternate link 300 is provided for sharing secure access data in conjunction with the initialization process. In an embodiment of the present invention the link 300 includes a wired link such as conforming to an IEEE-488, RS-232, Ethernet, Universal Serial Bus (USB), Personal Computer Interface (PCI), Firewire, small computer service interface (SCSI), ASI (Asynchronous Serial Interface), SPI (Serial Peripheral Interface) or other wired interface, either standard or proprietary. Alternatively the link 300 includes an line of sight optical link such as conforming to an Infrared Data Association (IrDA) standard, or other optical link, either standard or proprietary. The use of these connections helps to further secure the initialization process so that secure access data can be shared between the multimedia server module 12' and the client module 200' to further avoid reception by unauthorized users.

In an embodiment of the present invention, the multimedia server module 12' and the client module 200' are initialized by connecting the optional wired connection or positioning the multimedia server module 12' and client module 200' within a line of sight in range of the optional optical link. Once the secure access data is shared and the initialization process is complete the server module 12' and the client module 200' can be disconnected and/or repositioned for normal operation and the RF communication link can be initiated, with the passwords, encryption keys etc., that are used to secure the communication.

Figure 7:
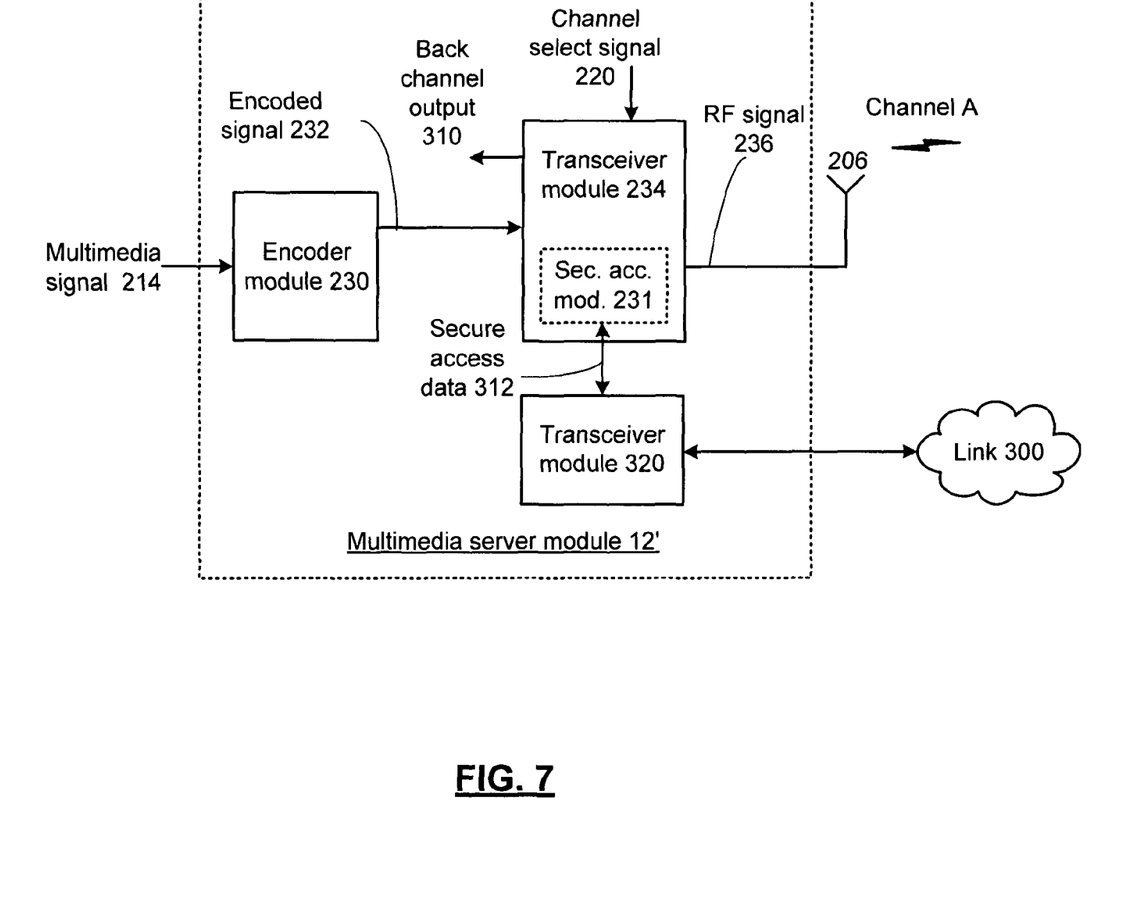
FIG. 7 presents a block diagram representation of a multimedia server module 12' in accordance with an embodiment of the present invention.

FIG. 7 presents a block diagram representation of a multimedia server module 12' in accordance with an embodiment of the present invention. In particular, multimedia server module 12' includes common elements from multimedia server module 12 that are referred to by common reference numerals. In addition, transceiver module 320 is included, such as a wired transceiver or optical transceiver used to provide communication over link 300, discussed in conjunction with FIG. 6, and to transmit secure access data 312 to and from multimedia server module 12'.

Figure 8:
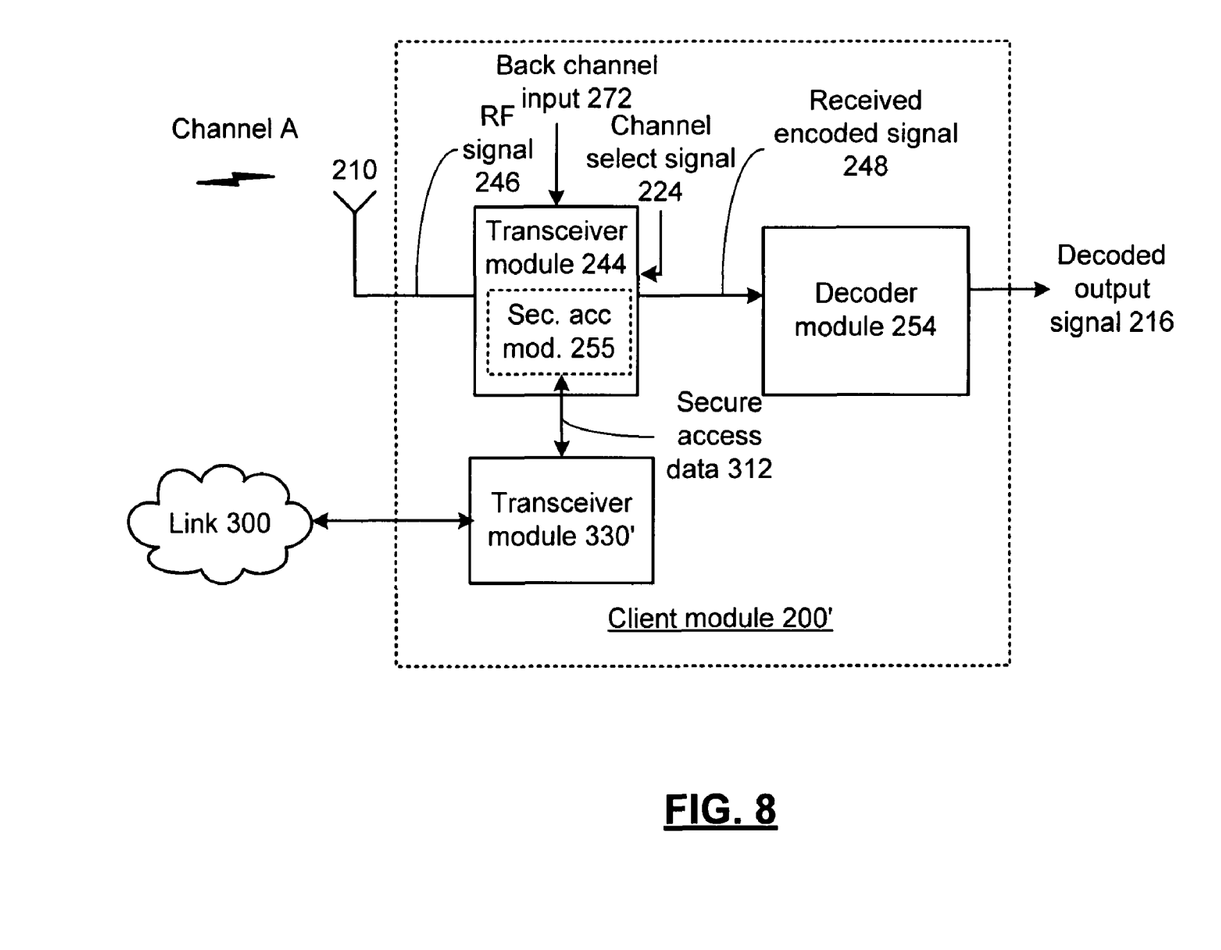
FIG. 8 presents a block diagram representation of a client module 200' in accordance with an embodiment of the present invention.

FIG. 8 presents a block diagram representation of a client module 200' in accordance with an embodiment of the present invention. In particular, client module 200' includes common elements from client module 200 that are referred to by common reference numerals. In addition, transceiver module 330 is included, such as a wired transceiver or optical transceiver used to provide communication over link 300, discussed in conjunction with FIG. 6, and to transmit secure access data 312 to and from client module 200'.

Figure 9:
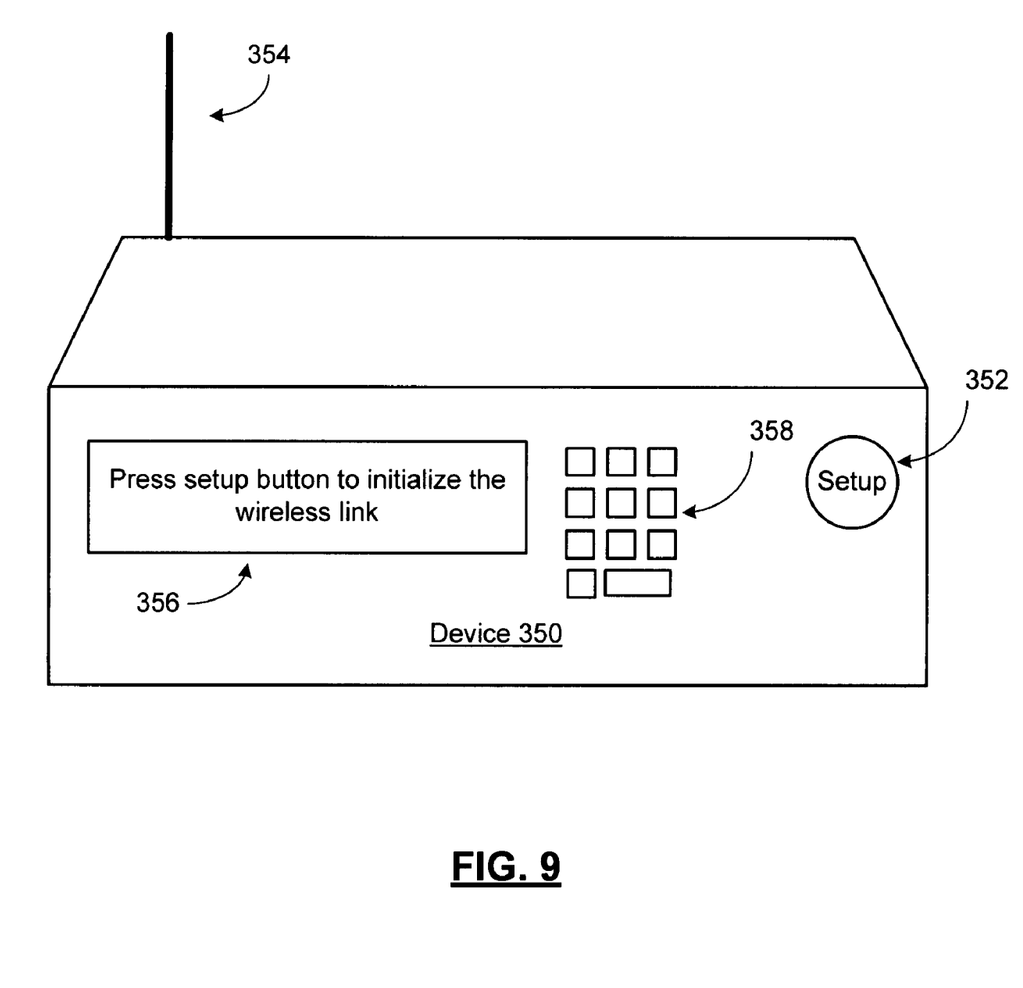
FIG. 9 presents a pictorial representation of a device 350 in accordance with an embodiment of the present invention.

FIG. 9 presents a pictorial representation of a device 350 in accordance with an embodiment of the present invention. A device 350 is shown that can include the functions and features ascribed to multimedia server modules 12, multimedia server module 12', client module 200 and/or client module 200'. In particular, device 350 includes an antenna 354, such as antennas 206 or 210 for operation with the RF communication link. In addition, device 350 optionally includes either a wired port or a optical communications port to communicate via link 300, if so equipped. A set-up button 352 is provided that produces a signal that triggers the secure access module of device 350 to begin sharing the secure access data as previously described. A display 356 is included, such as a black and white or color LCD display that is capable of displaying one or more messages, icons or other displays relating to the control and operation of device 350.

For instance, device 350 can enter into initialization mode automatically when the device 350 is powered up or when the device 350 loses connectivity over the RF communications link for a period of time. In response, the display 356 can display one or more prompts to the user regarding the steps in the initialization process. Examples include the following:

"Connect USB cable to server to begin"
"Press set-up button to initialize the wireless link"
"Set-up complete, OK to disconnect"
Or
"Place front of unit in front of server"
"Press set-up button to initialize the wireless link"
"Set-up complete, OK to reposition unit"

In an embodiment of the present invention, one of the two devices, such as the client module (200 or 200') or the server module (12 or 12') each includes a setup button, such as setup button 352, for initiating the sharing of the secure access data over the RF communication link, or the optional alternate link in response to the user activation of the button. In this case, the pressing of the button on a first device initiates the transfer of information, either unidirectionally or bi-directionally, with the other device responding to the receipt of data and signaling from the first device. In alternative embodiments of the present invention, both devices are equipped with such setup buttons and the transfer of secure access data is initiated in response to the pressing of either button, or by pressing both buttons at the same time or by pressing both buttons within a short time interval, such as 10 seconds.

In an embodiment of the present invention, the device 350 includes a keyboard 358 for entering further user commands and responses. In particular, in the event that device 350 is equipped with two or more links—such as an RF communication link and one or more links 300, the user can be prompted to select the particular one, from the plurality of links to use to transfer the secure access data (e.g. "press 1 for RF, 2 for IR, 3 for USB," etc.) In alternative embodiment, the device 350 can automatically select the particular link to use to transfer the secure access data by determining, on a test basis, which links are connected and selecting a link that is active or by selecting a particular one of a plurality of active links in a priority order (e.g., wired—first, IR—second, RF—third).

Figure 10:
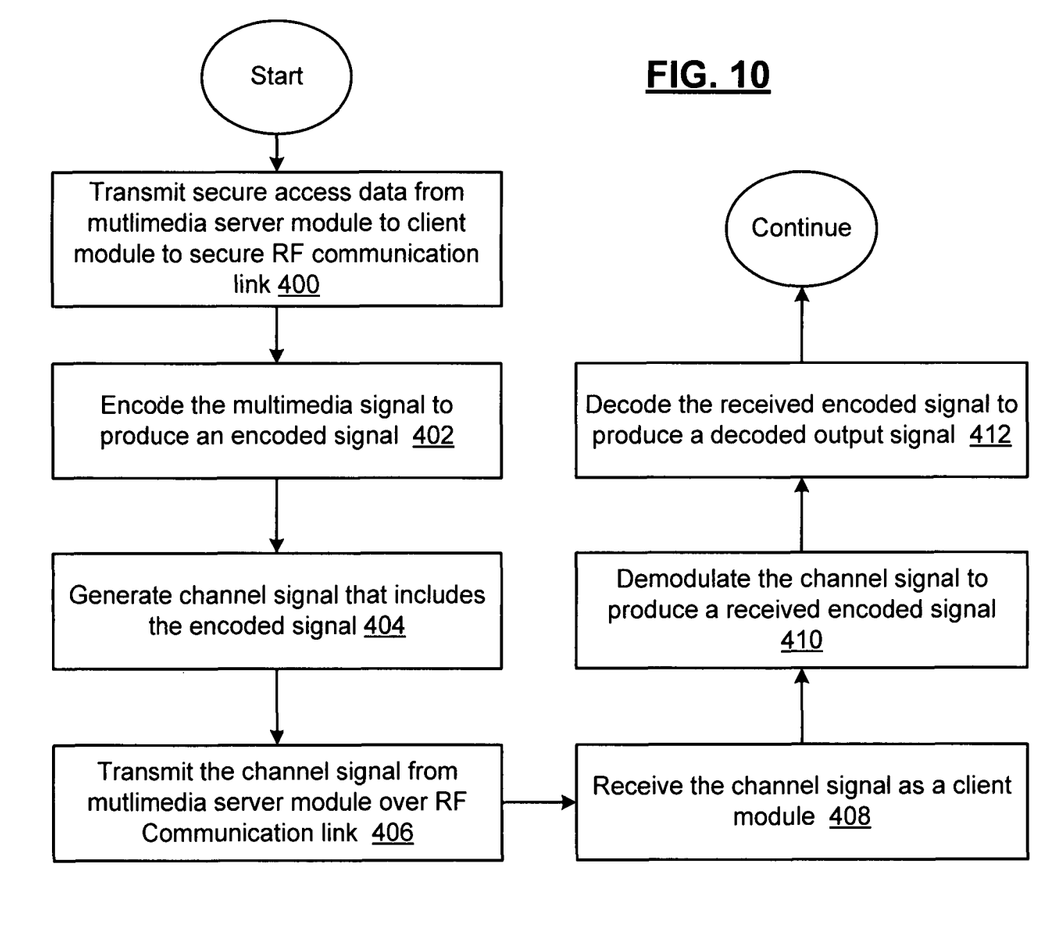
FIG. 10 presents a flow chart representation of a method in accordance with an embodiment of the present invention.

FIG. 10 presents a flow chart representation of a method in accordance with an embodiment of the present invention. In particular, a method is presented for use in conjunction with one or more of the functions and features described in association with FIGS. 1-9. In step 400, secure access data is transmitted from a multimedia server module to a client module to secure an RF communication link. In step 402, at least one multimedia signal is encoded to produce an encoded signal. In step 404, channel signal is generated that includes the encoded signal. In step 406, the channel signal is transmitted over the RF communication link from the multimedia server module. In step 408, the channel signal is received at a client module. In step 410, the channel signal is demodulated to produce a received encoded signal. In step 412, the received encoded signal is decoded into a decoded output signal.

In an embodiment of the present invention, the secure access data includes one of a password and an encryption key. The secure access data can be transmitted over the RF communication link, optionally placed automatically, in a low power transmission mode. Alternatively, the secure access data can be transmitted over an alternate connection, such as an optical or wired connection. Further, the secure access data can be shared in response to the user activation of a button on at least one of the multimedia server module and the client module.

In an embodiment, step 406 encodes or transcodes the multimedia signal in accordance with one of a Motion Picture Experts Group (MPEG) standard, and a Society of Motion Picture and Television Engineers (SMPTE) standard. Further, step 410 transmits the RF signal over a broadband wireless access network that conforms to at least one of the following standards: 802.11x, Ultra Wideband (UWB), and Worldwide Interoperability for Microwave Access (WiMAX).

Figure 11:
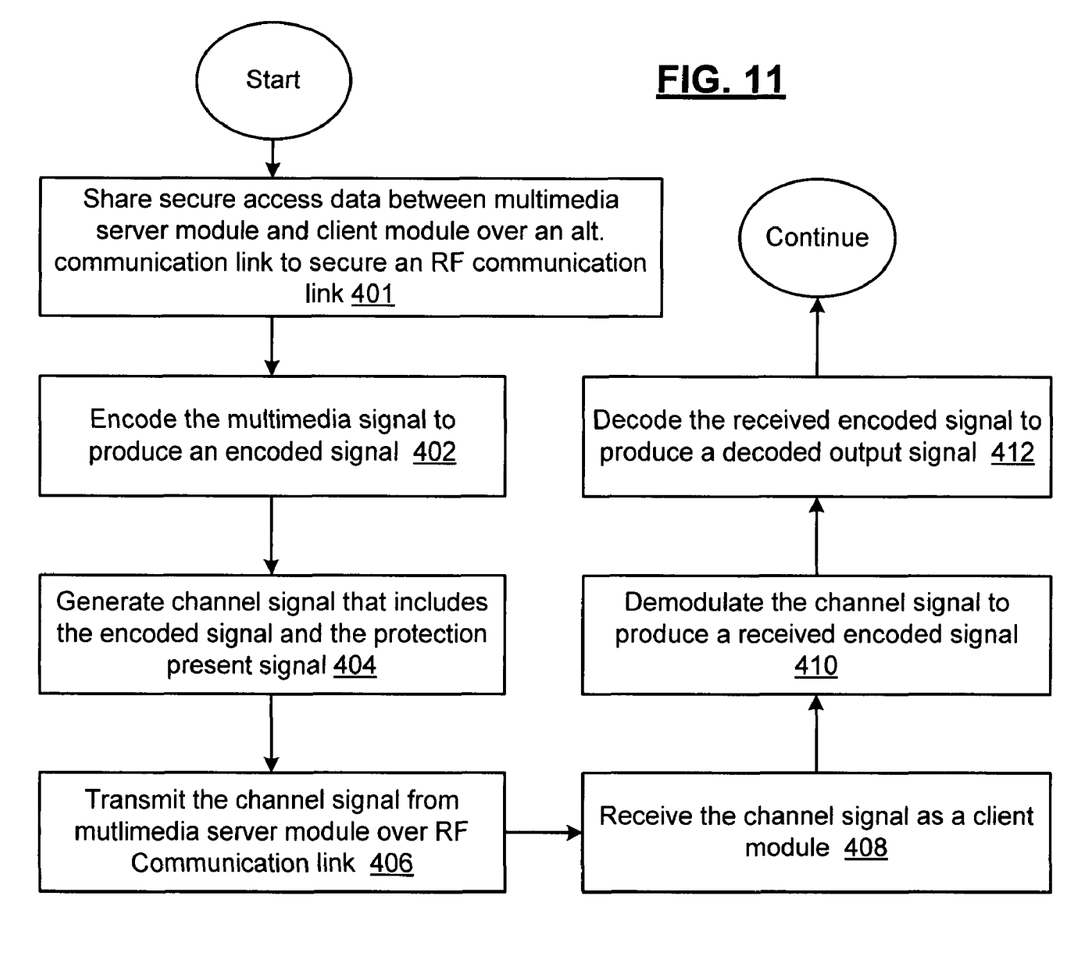
FIG. 11 presents a flow chart representation of a method in accordance with an embodiment of the present invention.

FIG. 11 presents a flow chart representation of a method in accordance with an embodiment of the present invention. A method is presented for use in conjunction with one or more of the functions and features described in association with FIGS. 1-9. In particular, a method is presented that includes many of the elements of the method of FIG. 10 that are referred to by common reference numerals. In addition, in step 401, secure access data is shared between a multimedia server module and client module over an alternate communication link in order to secure an RF communication link.

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, client module and secure access module module. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A multimedia client/server system comprising:

a multimedia server, coupleable to a plurality of multimedia sources that produce at least one multimedia signal, the multimedia server including:
- an encoder module that encodes the at least one multimedia signal to produce an encoded signal; and
- a radio frequency (RF) server transceiver module, coupled to the encoder module, that produces a channel signal that includes the encoded signal and that wirelessly transmits the channel signal in a regular power mode, the RF server transceiver module including a server secure access module that secures the channel signal based on secure access data, wherein the RF transceiver module enters a low power mode during a channel setup procedure between the multimedia server and a client and wherein the RF transceiver module transmits the secure access data to the client in the low power mode, during the channel setup procedure and prior to transmitting the channel signal; and the client, coupleable to at least one client device, the client including:
- an RF client transceiver module that receives and demodulates the channel signal to produce a received encoded signal, the RF client transceiver module including a client secure access module that accesses the channel signal based on the secure access data; and
- a decoder module, coupled to the RF client transceiver module, that decodes the received encoded signal into a decoded output signal.

2. The multimedia client/server system of claim 1 wherein the secure access data includes one of a password and an encryption key.

3. The multimedia client/server system of claim 1 wherein the secure access data is transmitted by the multimedia server to the client by the RF server transceiver module after the RF server transceiver module is automatically set in the low power mode.

4. The multimedia client/server system of claim 1 wherein the encoder module encodes the at least one multimedia signal in accordance with one of a Motion Picture Experts Group (MPEG) standard, and a Society of Motion Picture and Television Engineers (SMPTE) standard.

5. The multimedia client/server system of claim 1 wherein the RF server transceiver module and the RF client transceiver module communicate over a broadband wireless access network that conforms to at least one of the following standards: 802.11x, Ultra Wideband (UWB), and Worldwide Interoperability for Microwave Access (WiMAX).

6. The multimedia client/server system of claim 1 wherein the encoder module transcodes the at least one multimedia signal.

* * * * *